United States Patent
Inoue et al.

[11] Patent Number: 6,156,993
[45] Date of Patent: Dec. 5, 2000

[54] HEAT TREATMENT METHOD AND APPARATUS USING THERMAL PLASMA, AND HEAT TREATED SUBSTANCE PRODUCED THEREBY

[75] Inventors: Yoshiaki Inoue; Seiji Yokota; Akira Terajima; Kazuhiro Kawasaki; Masaaki Tamatani; Keiko Albessard; Naotoshi Matsuda; Miwa Okumura; Hirofumi Takemura, all of Kanagawa-ken, Japan

[73] Assignees: Neturen Co., Ltd., Tokyo; Toshiba Corporation, Kanagawa-ken, both of Japan

[21] Appl. No.: 09/543,912

[22] Filed: Apr. 6, 2000

Related U.S. Application Data

[62] Division of application No. 08/997,474, Dec. 23, 1997, Pat. No. 6,080,954.

[30] Foreign Application Priority Data

Dec. 27, 1996 [JP] Japan .................................. 8-356659
Dec. 27, 1996 [JP] Japan .................................. 8-635652

[51] Int. Cl.⁷ ................................................ B23K 10/00
[52] U.S. Cl. .............................. 219/121.36; 219/121.37; 219/121.48; 219/121.43; 219/121.51
[58] Field of Search .......................... 219/121.36, 121.43, 219/121.59, 121.51, 121.48, 121.37, 121.38; 315/111.21, 111.51

[56] References Cited

U.S. PATENT DOCUMENTS

| | | |
|---|---|---|
| 5,066,125 | 11/1991 | Rogers et al. . |
| 5,222,448 | 6/1993 | Morgenthaler et al. . |
| 5,340,023 | 8/1994 | Itoh et al. . |
| 5,560,844 | 10/1996 | Boulos et al. . |
| 5,749,937 | 5/1998 | Detering et al. . |
| 5,908,566 | 6/1999 | Seltzer . |

FOREIGN PATENT DOCUMENTS 6-25717  2/1994  Japan .

*Primary Examiner*—Mark Paschall
*Attorney, Agent, or Firm*—Finnegan, Henderson, Farabow, Garrett & Dunner, L.L.P.

[57] ABSTRACT

In the method, apparatus and the substance produced thereby: a plasma flame 1 is produced by a plasma torch 11; the plasma flame 1 is passed through a plasma flame furnace 21 which controls the heat of the plasma flame 1; then, the plasma flame 1 is injected into a reactor column 31 to heat the substance. The substance may be a particle. The plasma flame 1 has a wide flame area in which a temperature of flame is uniform.

17 Claims, 7 Drawing Sheets

HEAT TREATMENT METHOD AND APPARATUS USING THERMAL PLASMA, AND HEAT TREATED SUBSTANCE PRODUCED THEREBY

This is a division of application Ser. No. 08/997,474, filed Dec. 23, 1997 now U.S. Pat. No. 6,080,954.

BACKGROUND OF THE INVENTION

1. Field of the Invention

The present invention relates to: a heat treatment method for heat treating a substance or particles by means of a thermal plasma; the substance thus heat treated through the heat treatment method; a thermochemical synthesis method for producing a synthetic material by the use of thermal plasma heating; the synthetic material produced through the thermochemical synthesis method; a sphering method for forming each of particles into a spherical shape through the thermal plasma heating; each of the particles thus spherically-shaped through the sphering method; a surface coating method for coating each of particles with a surface material produced by melting a surface of each of the particles or an added material on the surface of each of the particles by means of the thermal plasma; each of the particles coated with the surface material; and, a thermal plasma heat treatment apparatus for carrying out the above methods.

2. Description of the Prior Art

For example, polycrystalline silicon of the silicon wafers for IC's is produced through the following chemical reaction: $SiCl_4 + 2H_2 = Si + 4HCl$.

Heretofore, this chemical reaction has been realized through a conventional method such as Siemens method, Union Carbide method and the like using electric furnaces, flames and like heating means. The above chemical reaction requires a high temperature atmosphere having a temperature of more than 1000° C. Higher atmosphere is required when a faster reaction rate is demanded. Consequently, the conventional method is disadvantageous in cost. Further, in the conventional method, when the flame is used as its heating means, there is a fear that a product produced through the above chemical reation is contaminated with the flame. Consequently, a thermal plasma is a preferable heating means to realize such high temperature atmosphere required in the above chemical reaction, since the thermal plasma is free from any of the above-mentioned problems inherent in the conventional method.

On the other hand, each of particles of a powder produced through the chemical reaction assumes a non-spherical shape. However, in order to increase in density of a sintered product or in brightness of a fluorescent substance (i.e., phosphor), it is desirable for each of particles of the powder to assume a spherical shape. Consequently, heretofore, a so-called sphering treatment is conducted, in which treatment each of the particles as a starting material is heated to a temperature slightly higher than its melting point so that each of the particles assumes a spherical shape under the effect of its melted surface tension. Such sphering treatment conducted in a radio-frequency induction heating method using a thermal plasma is known (see: a paper presented by Tadahiro SAKUTA at a meeting of the switch protection research division of the Japanese Electric Society, 1993; and, Japanese Patent Laid-Open No. Hei 6-25717).

In the above chemical reaction, when the atmosphere temperature thereof is too low, its reaction rate decreases. On the other hand, when the atmosphere temperature is too high, a product obtained is decomposed, which makes it impossible to obtain a product having a predetermined composition and physical properties. Further, in the above-mentioned sphering treatment in which each of the particles as a starting material should be heated to a temperature slightly higher than its melting point using the radio-frequency induction thermal plasma so that each of the particles assumes a spherical shape under the effect of its melted surface tension, when each of the particles is not heated to the temperature slightly higher than its melting point, each of the particles fails to assume a spherical shape since its surface is not melted. On the other hand, when each of the particles is heated to a temperature excessively higher than its boiling point, each of the particles changes in construction or composition by evaporation of its components or ingredients. Consequently, when the thermal plasma is used as heating means in the above sphering treatment, it is necessary to keep constant a temperature of a heating portion in the thermal plasma. When each of the particles is made of a substance having a high melting point and a boiling point slightly higher than the melting point, the heating portion of the thermal plasma must be kept at a high temperature within a relatively narrow range. The radio-frequency induction thermal plasma (hereinafter referred to as the radio-frequency plasma) has a benefit to make it easy to obtain a high temperature necessary for the above sphering treatment. Further, the radio-frequency plasma has the advantage over a so-called electrode-type thermal plasma that it is free from any contaminants. Conseqeuntly, the radio-frequency plasma is a preferable heating means for the sphering treatment and for the synthesis of the substance.

In order to protect the surface of each of the spherical particles from attacks by moisture and harmful radiation, only the surface of each of the particles can be melted so that each of the particles is coated with a layer of the thus melted and solidified surface. One of zinc sulfide phosphors, for example, a phosphor ZnS:Cu is used an luminescent material in an electroluminescence display unit and like units. However, this zinc sulfide phosphor is poor in water-resisting properties. Due to its poor water resistance, this luminescent material reacts with moisture contained in the air and loses its luminescent properties when used solely in the units. Consequently, until now, in many applications, the particles of the zinc sulfide phosphor (ZnS:Cu) are sandwiched in between a pair of protective films to isolate themselves from the air. However, this raises the manufacturing cost of the display unit. Under such circumstances, considered as a hint to the present invention is a finding that: when the individual particles of the zinc sulfide phosphor (ZnS:Cu) are coated with individual protection means to isolate themselves from the air, it is possible to eliminate the use of the protective films, which may reduce the manufacturing cost of the display unit.

Based on the above finding, as shown in FIG. 7(a), each of the particles of the zinc sulfide phosphor (ZnS:Cu) is coated with silica powder, and then heated so that the silica powder deposited on the surface of each of the particles is melted to form a silica layer covering each of the particles, whereby each of the particles is improved in water resistence by means of the silica layer after completion of solidification thereof. On the other hand, a melting point of silica is high (i.e., more than or equal to 1000 degrees centigrade), whereas, the zinc sulfide phosphor (ZnS:Cu) to be coated with the silica layer is badly damaged when subjected to a temperature of more than or equal to 300 degrees centigrade. Consequently, in order to coat the particle of the zinc sulfide phosphor (ZnS:Cu) with the silica layer, it is necessary to melt only the silica on the surface of each of the particles without heating the zinc sulfide phosphor (ZnS:Cu) to be coated with the silica.

However, in FIG. 6, a temperature of a vortex stream flame center 2 of the radio-frequency plasma described above reaches 10,000 K. Even a temperature of a front-end portion 3 of the flame reaches 5,000 K. Consequently, in a conventional heat treatment apparatus in which the conventional radio-frequency plasma issued from a plasma torch is directly applied to a workpiece, though it is possible to conduct the sphering treatment with respect to a material having a simple composition, as for materials having complicated compositions with low melting points and intremetallic compounds, the heat of the radio-frequency plasma is too high in temperature so that these materials decompose when subjected to the heat, which makes it impossible to obtain the product particles having the same properties as those of the starting material. Further, in the sphering treatment of a material having a low melting point, the temperature of the plasma is too high so that a large amount of ultrafine powder is produced, which impairs the yield of usable particles having a predetermined grain size. In addition, classifying operation of such ultrafine powder is costly, and somtimes hard to accomplish. In general, a temperature necessary for the sphering treatment is within a range of from 773 to 3273 K. Consequently, it is necessary to heat the particles in a restricted area of the front-end portion of the plasma. In this case, it is possible to increase the range of the predetermined temperature of the plasma flame when the temperature of the vortex stream flame center 2 in the plasma is decreased. However, when the temperature of the plasma is decreased unduly, the plasma flame becomes unstable or ceases to exist. Consequently, in the conventional heat treatment apparatus, the amount of its radio-frequency input energy, types of plasma gases and their flow rates used in the apparatus are appropriately selected to stabilize the radio-frequency plasma flame (see Japanese Patent Laid-Open No. Hei 8-109375).

In case that the particles of the starting material, i.e., zinc sulfide phosphor (ZnS:Cu) is coated with silica, a direct heat treatment method using the conventional radio-frequency plasma suffers from an ultrahigh temperature of the plasma flame, in which a predetermined temperature is available only in a narrow flame range or area. Due to such narrow flame area, each of the particles subjected to the conventional heat treatment method is heated to an undue high temperature even in its inner portion, which damages the zinc sulfide phosphor (ZnS:Cu) so that the thus treated particle product often fails to emit light in the display unit.

On the other hand, as for a so-called carbon fiber, it is known that the carbon fiber could be improved in tensile strength and in elastic modulus when subjected to a high temperature heat treatment. If a pitch-based carbon fiber is improved in strength so as to have the same strength as that of a polyacrylonitrile-, i.e., PAN-based carbon fiber through the high temperature heat treatment, it becomes possible to reduce the manufacturing cost of the desired carbon fiber. In this case, it is necessary to conduct such heat treatment at a temperature of 3000 degrees centigrade in an inert-gas atmosphere free from any impurity contamination. Although the heat treatment may be conducted in an electric furnace, it is preferable to conduct the heat treatment using the radio-frequency induction thermal plasma. However, in the conventional heat treatment method in which the plasma flame is directly applied to the workpiece, it is hard to control its plasma flame in temperature, which makes it difficult to uniformly heat the workpiece, and, therefore makes it difficult to improve the workpiece in material properties.

SUMMARY OF THE INVENTION

Under such circumstances, the present invention was made. Consequently, it is an object of the present invention to provide a heat treatment method for heat treating a substance or particles by means of a thermal plasma.

It is another object of the present invention to provide the substance thus heat treated through the heat treatment method.

It is further another object of the present invention to provide a thermochemical synthesis method using a thermal plasma heating.

It is still further another object of the present invention to provide a synthetic material produced through the thermochemical synthesis method.

It is another object of the present invention to provide a sphering method for forming each of particles into a spherical shape through the thermal plasma heating.

It is another object of the present invention to provide the particles each of which is thus spherically-shaped through the sphering method.

It is further another object of the present invention to provide a surface coating method for coating each of particles with a surface material produced by melting a surface of each of the particles or an added material on the surface of each of the particles by means of the thermal plasma.

It is still further another object of the present invention to provide the particles each of which is coated with the surface material.

It is another object of the present invention to provide a thermal plasma heat treatment apparatus for carrying out the above methods.

According to a first aspect of the present invention, the above objects of the present invention are accomplished by providing:

A thermal plasma heat treatment apparatus for heat treating a workpiece by means of a thermal plasma, comprising:
  a thermal plasma torch for producing a thermal plasma;
  a plasma flame furnace for controlling the heat of the thermal plasma thus produced by the plasma torch;
  a reactor column in which the workpiece is subjected to a thermochemical reaction; and
  a supply means for supplying the workpiece into the reactor column.

Namely, in a conventional thermal plasma heating, a plasma flame produced by a plasma torch is directly applied to a workpiece. However, since the thermal plasma is partially very high in temperature, the workpiece is excessively heated to a temperature beyond a predetermined value, which makes it impossible to accomplish a desired heat treatment necessary for the workpiece. The thermal plasma is prone to cease to exist when its temperature decreases, which makes it difficult to control the thermal plasma in use.

On the other hand, in the thermal plasma heat treatment apparatus of the present invention, the plasma flame furnace is disposed in a downstream side of the plasma torch, so that the plasma flame produced by the plasma torch is passed through the plasma flame furnace, and issued outward therefrom. Due to the above construction, it is possible for the apparatus of the present invention to obtain a desired plasma flame which is low and uniform in temperature and wide in flame area, without any fear of the plasma flame's ceasing to exist. According to the present invention, the plasma flame is issued from the plasma flame furnace into the reactor column in which the workpiece supplied by the supply means is subjected to a desired heat treatment. Consequently, the apparatus of the present invention makes it possible to prevent the workpiece from being heated to an extremely high temperature by the thermal plasma having an ultrahigh temperature, and it realizes a stable heat treatment of the workpiece by means of the thermal plasma.

According to a second aspect of the present invention, the above objects of the present invention are accomplished by providing:

The thermal plasma heat treatment apparatus as set forth in the first aspect of the present invention, wherein the plasma flame furnace comprises:

a plasma passage through which a plasma flame produced by the plasma torch passes; and a diffuser means for diffusing a stream of the plasma flame, the diffuser means being disposed in an intermediate portion of the plasma passage.

Due to the above construction of the present invention, when the plasma flame produced by the plasme torch passes through the plasma passage and the diffuser means to enter the plasme flame furnace, the plasma flame is diffused and stirred to have its temperature decreased and also have its flame area of a uniform temperature broadeded, which makes it possible for the apparatus of the present invention to easily accomplish its objects.

According to a third aspect of the present invention, the above objects of the present invention are accomplished by providing:

The thermal plasma heat treatment apparatus as set forth in the second aspect of the present invention, wherein:

the plasma passage and the diffuser means both of the plasma flame furnace are constructed of:

an inlet tube into which the plasma flame flows;

an outlet tube from which the plasma flame flows; and a diffusion chamber disposed between the inlet tube and the outlet tube, the diffusion chamber being enlarged in diameter.

Due to the above construction, the plasma flame is sufficiently diffused and stirred. Further, a barrier member, which changes the flow direction of the plasma flame, may be disposed in the diffusion chamber of the plasma passage. The provision of the barrier member may enhance such diffusion and stirring operation of the plasma flame in efficiency. Further, the plasma torch may be provided with a quenching gas injection means for injecting a quenching gas into the plasma flame to decrease the temperature of the plasma flame.

Further, a reaction chamber, which performs a heat treatment of the workpiece by introducing therein the plasma flame having passed through the plasma flame furnace, may be provided in the side of the outlet tube from which the plasma flame of the plasma flame furnace flows. In addition, the reaction chamber may be provided with a supply means through which the workpiece is continuously supplied into the reaction chamber. The above construction of the present invention is suitable for continuously performing a heat treatment of an elongated workpice such as fibers and the like. In other words, due to the above construction, the plasma flame having been diffused and stirred in the plasma flame furnace is further stirred in the reaction chamber to broaden its flame area of a uniform temperature while heating the walls of the reactor column, which enables the workpiece to be uniformly heated.

In the apparatus of the present invention, it is possible to obtain a clean plasma flame having a wide flame area of a uniform temperature. Conseqeuntly, the apparatus of the present invention is suitable for performing a heat treatment such as: a thermochemical synthesis treatment of a substance such as polycrystalline silicon and the like; a sphering treatment for heating and melting each of particles of a substance such as a starting material of phosphor and intermetallic compounds, the particles each of which is thus melted being then cooled to assume a spherical shape; a coating treatment for heating and melting only a surface portion of each of the particles of the substance such as the starting material of phosphor and the like, the surface portion of each of the particles thus melted being then cooled to form a solidified layer for covering an inner portion of each of the particles; and, a physical property improving treatment for improving the physical properties of a carbon fiber by heating.

The plasma passage and the diffusion means of the plasma flame furnace are made of heat-resisting materials such as carbon-based materials and ceramics, and also may be made of metallic materials when provided with a suitable cooling means. In some applications, it is possible to further decrease the temperature of the plasma flame, which enables the apparatus of the present invention to be used in such applications performed in a lower temperature atmosphere.

On the other hand, the plasma torch used in the apparatus of the present invention is preferably constructed of a radio-frequency induction thermal plasma torch producing a clean plasma flame. However, the plasma torch may be constructed of an electrode-type plasma torch.

A thermal plasma heat treatment method of the present invention for subjecting each of particles to a heat treatment conducted by means of a thermal plasma, comprises the steps of:

producing a plasma flame by means of a plasma torch;

passing the plasma flame through a plasma flame furnace;

injecting the plasma flame into a reactor column; and applying the plasma flame to each of the particles so that the particles are heat treated.

In a conventional heat treatment method using the thermal plasma, a workpiece is directly heated by the plasma flame produced by the plasma torch in its heat treatment. Since the temperature of the thermal plasma is partially very high, there is a fear that the workpiece is heated to a temperature beyond a desired predetermined value to lose its ingredients by evaporation, which results in poor physical properties of a completed product.

In contrast with this, in the heat treatment method of the present invention, the plasma flame of the plasma torch passes through the plasma flame furnace and is then injected into the reactor column so as to have its flame lowered in temperature and broadened in flame area of the thus lowered and uniformed temperature. Consequently, in the heat treatment method of the present invention, it is possible to uniformly heat the workpiece without any fear of evaporation of ingredients of the workpiece caused by overheating, which enables the method of the present invention to produce a product good and stable in composition or physical properties.

The heat treatment method of the present invention by means of the thermal plasma may be used to improve carbon fibers in physical properties, and also used to perform the thermochemical synthesis of polycrystalline silicon and like substances.

Namely, in the heat treatment method of the present invention, the workpiece such as carbon fibers and the like is heated by means of the thermal plasma having been controlled, which makes it possible to uniformly improve the workpiece in its physical properties and also possible to perform a high-temperature thermal synthesis of synthetic substances which are uniform in composition.

On the other hand, in the sphering treatment performed in the heat treatment method of the present invention, the workpiece or each of particles is heated and melted by the plasma flame's injection into the reactor column to assume a spherical shape. Particularly, such sphering treatment is preferable when each of the particles is made of phosphors. In a conventional heat treatment using a direct heating by means of the plasma flame of the plasma torch to make each of the particles of the phosphor spherical, each of the particles is heated to a temperature beyond a predetermined value due to a high temperature portion partially existing in the thermal plasma and loses its ingredients by evaporation, which results in a product's poor properties such as one in brightness, or in a product's poor yield due to a large amount of ultafine powder mixed in the product, or which makes it substantially impossible to classify the product in grain size.

In the sphering treatment performed in the heat treatment method of the present invention using the thermal plasma, the workpiece is heated and melted by the plasma flame which has been injected into the reactor column to decrease its temperature and to broaden its flame area of such decreased uniform temperature, so that the workpiece thus melted assumes a spherical shape. Consequently, there is no fear that the workpiece loses its ingredients by evaporation due to overheating, which makes it possible to improve the yield of the usable spherical product. The heat treatment method of the present invention described above is suitable for the sphering treatment of each of the particles of phosphors, intermetallic compounds and like substances. When the workpiece is made of a phosphor, the product produced by the method of the present invention is improved in brightness. As for the workpiece made of an intermetallic compound, it is possible to improve the product in sintered density.

Further, in the method of the present invention for producing the particles each of which is covered with a melted layer, the workpiece is heated by means of the plasma flame having been injected into the reactor column, so that only a surface portion of the workpiece is melted to cover an inner portion of the workpiece. The thus melted surface portion is then cooled and solidified to form a surface layer covering the inner portion of the workpiece.

Further, in the heat treatment method of the present invention, preferably: the substance is each of particles; and, the thermal plasma heat treatment is a coating treatment conducted with respect to each of the particles in a manner such that each of the particles is coated with the same substance as that of each of the particles or another substance different from that of each of the particles, and heated by means of the plasma flame injected into the reactor column to have only its surface portion melted, the surface portion thus melted being then cooled to form a solidified layer completely covering an inner portion of each of the particles. Further, in the method of the present invention, preferably, the inner portion of the particle is of ZnS:Cu phosphor; and, the surface portion of each of the particles forming the solidified layer completely covering the inner portion of each of the particles is of silica.

Namely, in the heat treatment method of the present invention for producing the phosphor (ZnS:Cu): only the surface portion of each of the particles is melted and solidified to form a solidified layer covering the inner portion of each of the particles; a substance deposited on a surface of each of the particles is melted and solidified to form a solidified layer covering each of the particles; or, only the silica deposited on a surface of the phospor (ZnS:Cu) is melted and solidified to form a solidified silica layer covering each of the particles of the phospor (ZnS:Cu). Consequently, in this method of the present invention, it is possible to heat and melt only the surface of the workpiece, without any fear of deterioration thereof, by means of the plasma flame having been injected into the reactor column, in place of the plasma flame directly issued from the plasma torch.

DESCRIPTION OF THE PREFERRED EMBODIMENTS

Hereinbelow, the present invention will be described in detail with reference to the accompanying drawings.

Figure 1:
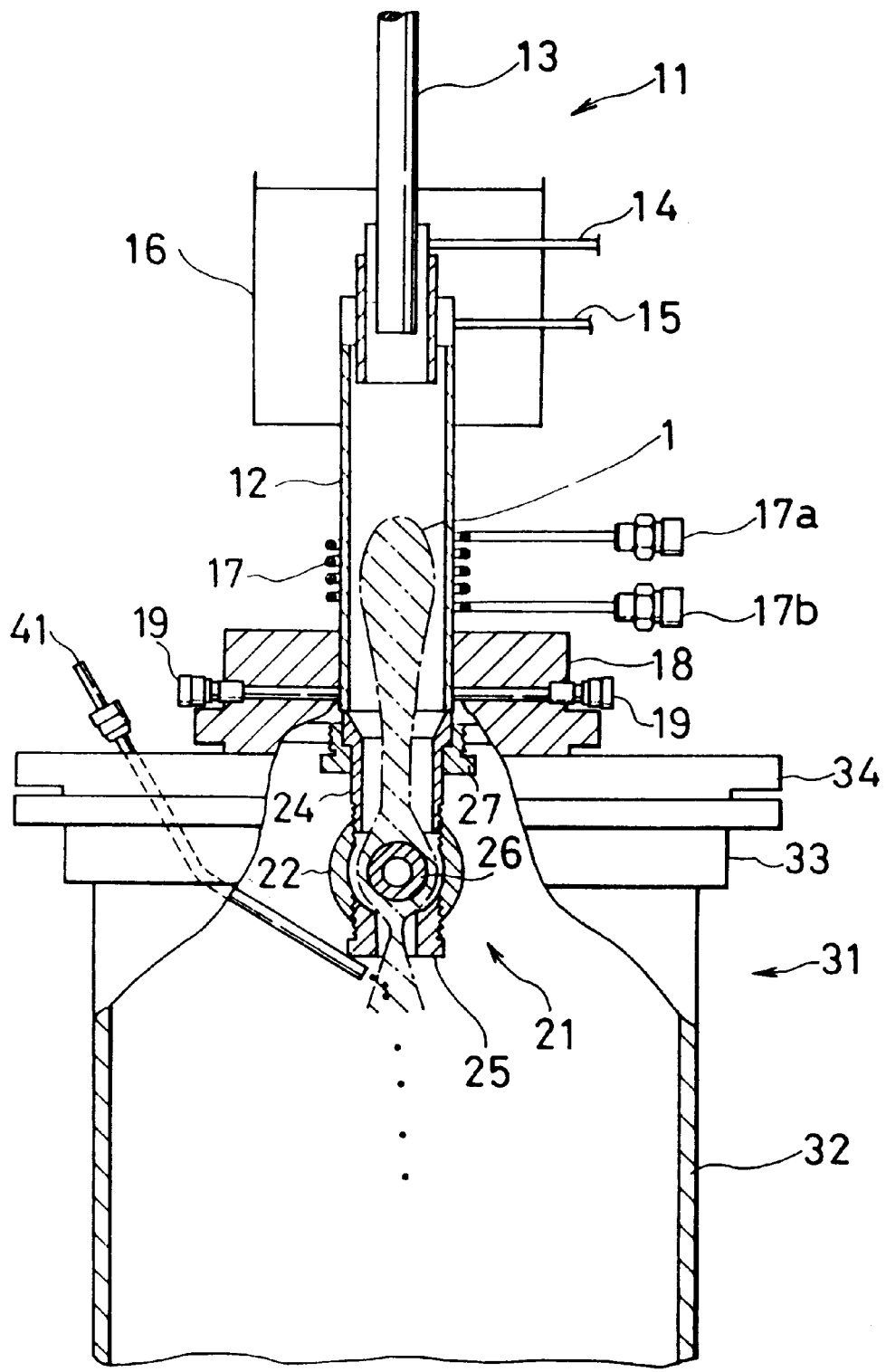
FIG. 1 is a longitudinal sectional view of a first embodiment of the heat treatment apparatus according to the present invention using the thermal plasma.
Figure 2:
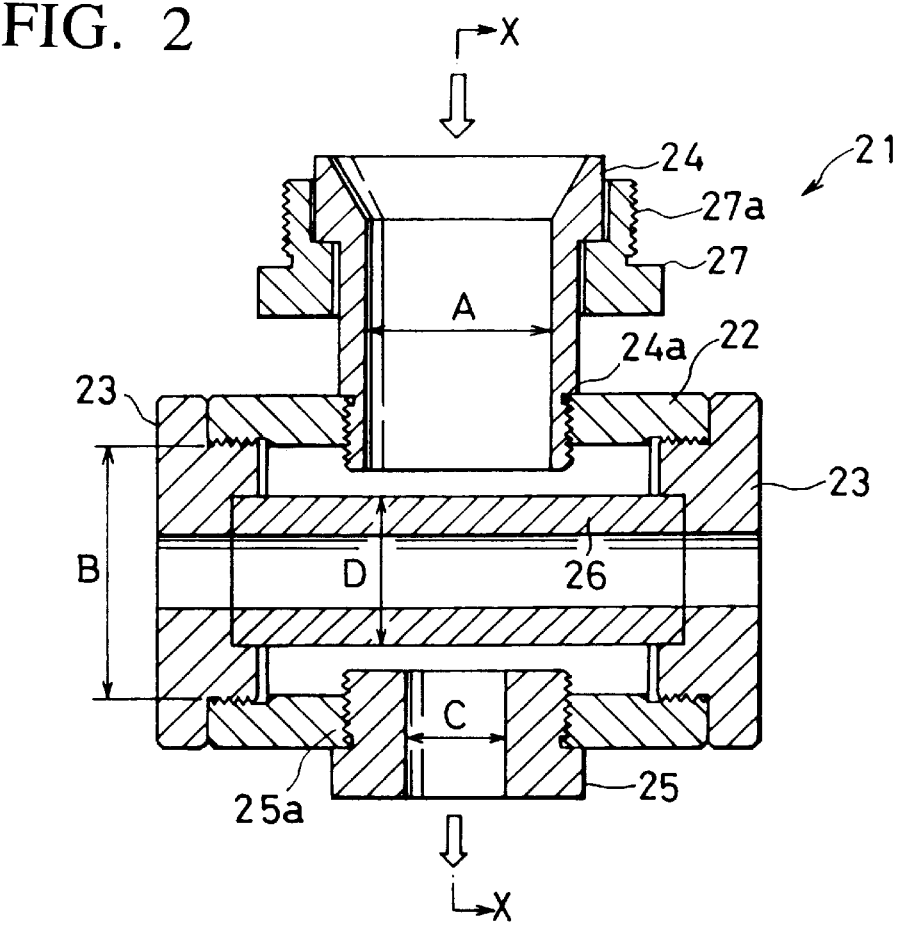
FIG. 2 is an enlarged longitudinal sectional view of the plasma flame furnace in the heat treatment apparatus shown in FIG. 1.
Figure 3:
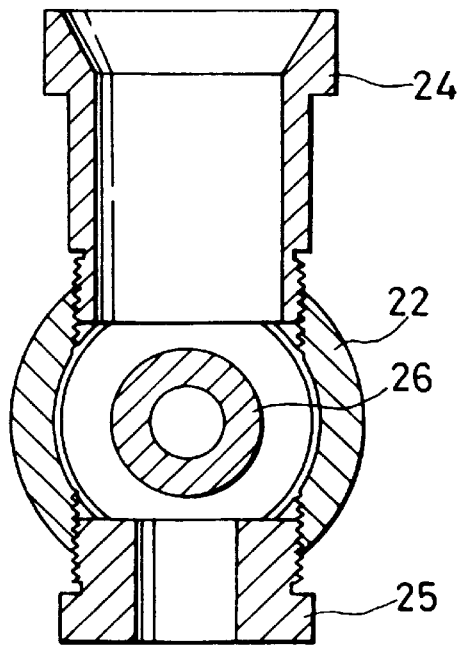
FIG. 3 is a longitudinal sectional view of the plasma flame furnace, taken along the line X—X of FIG. 2.

In FIG. 1, a first embodiment of a thermal plasma heat treatment apparatus of the present invention is shown in its longitudinal section. In FIG. 2, an enlarged longitudinal section of a plasma flame furnace of the apparatus shown in FIG. 1 is shown. FIG. 3 shows a longitudinal section of the plasma flame furnace, taken along the line X—X of FIG. 2. Incidentally, the plasma flame furnace shown in FIG. 1 corresponds to that of FIG. 3.

Now, the first embodiment of the thermal plasma heat treatment apparatus according to the present invention will be described with reference to FIG. 1.

As shown in FIG. 1, the heat treatment appatatus of the present invention using the thermal plasma is constructed of a plasma torch 11, a plasma flame furnace 21, a reactor column 31, and a supply means 41 for supplying a starting material or workpiece.

The plasma torch 11 is provided with a water-cooled double-walled quartz pipe 12 which is shown as a single-walled pipe in the drawings to facilitate understanding. A radio-frequency induction coil 17 is wound on an outer peripheral surface of the water-cooled quartz pipe 12. In operation, a radio-frequency current is supplied to the induction coil 17 through its opposite terminals 17a, 17b. Fixedly mounted in an upper portion of the quartz pipe 12 are a first gas supply tube 13, a second gas supply tube 14 and a third gas supply tube 15. These supply tubes 13, 14, 15 supply plasma gases to the interior of the quartz pipe 12. Desirable additional gases may be added to the plasma gases depending upon applications. These supply tubes 13, 14, 15 are covered by a water-cooled torch head 16 in the vicinity of the upper portion of the quartz pipe 12 a lower portion of which is fixedly mounted in a water-cooled jacket 18. A quenching gas supply tube 19 is fixedly mounted in this jacket 18.

In operation, in the plasma torch 11 having the above construction, the plasma gases are supplied to the quartz tube 12 through the supply tubes 13, 14, 15, while the radio-frequency induction coil 17 is energized with a radio-frequency power. As a result, as shown in FIG. 1, a thermal plasma 1 is produced inside the quartz pipe 12 as shown in one-dotted chain line. The thermal plasma 1 thus produced inside the quartz pipe 12 is then injected downward through a lower portion of the quartz pipe 12. The plasma torch 11 described above has the same construction as that of a conventional one. A plasma flame furnace 21 is provided under the lower portion of the quartz pipe 12 so that the plasma 1 injected downward enters the plasma flame furnace 21. As shown in FIGS. 2 and 3, the plasma flame furnace 21 is provided with a hollow cylindrical trunk portion 22 which has its opposite ends closed with a pair of plugs 23. An inlet tube 24 of the plasma flame and an outlet tube 25 of the plasma flame are threadably connected with opposite sides 24a and 25a of a center of the trunk portion 22, respectively. A barrier member 26, which assumes a tubular or rod-like shape, is coaxially disposed inside the trunk portion 22 of the plasma flame furnace 21, and has its opposite ends fixedly mounted on the plugs 23. As described above, the interior of the trunk portion 22 is formed into a diffusion chamber which cooperates with the barrier member 26 to serve as a diffusion means for the plasma flame entered. An inner diameter "A" of the inlet tube 24, that B of the trunk portion 22 and that C of the outlet tube 25 together with an outer diameter D of the barrier member 26 are empirically determined on the basis of the types of the plasma gases, the flow velocity thereof, the flow rate thereof, an applied radio-frequency power, and the types of workpieces to be heat treated. The plasma flame furnace 21 is fixedly mounted in a lower portion of the plasma torch 11 by fixedly mounting an upper end of the inlet tube 24 on a lower surface of the water-cooled jacket 18 through a nipple joint 27. Incidentally, when the barrier member 26 assumes a tubular shape as shown in FIG. 2, it is possible to cool the interior of the barrier member 26, which enables the barrier member to serve as a cooling means.

In the first embodiment of the apparatus of the present invention described above, each of the trunk portion 22 of the plasma flame furnace 21, inlet tube 24, outlet tube 25 and the barrier member 26 is made of carbon materials, and may be made of heat resisting materials such as ceramics and the like, and also may be made of metals such as copper and the like when a water-cooled construction is employed therein.

Figure 4A:
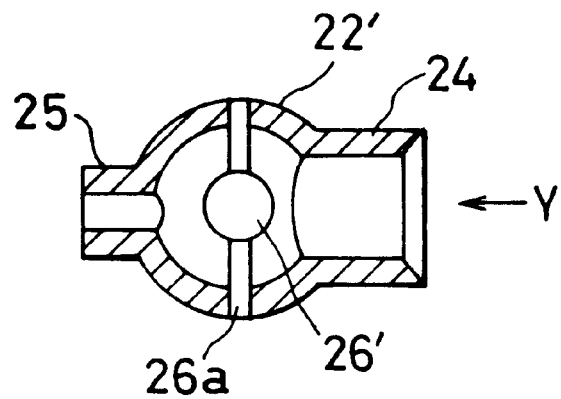
FIG. 4(a) is a longitudinal sectional view of another embodiment of the plasma flame furnace in which the diffusion chamber of the heat treatment apparatus of the present invention assumes a spherical shape.
Figure 4B:
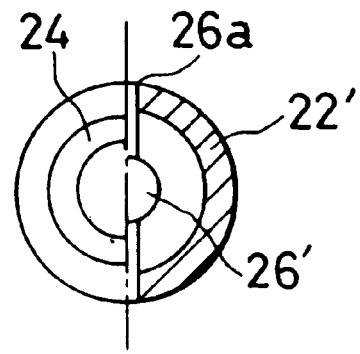
FIG. 4(b) is a partially broken side view of the another embodiment of the plasma flame furnace, looking in the direction of the arrow Y of FIG. 4(a)
Figure 5A:
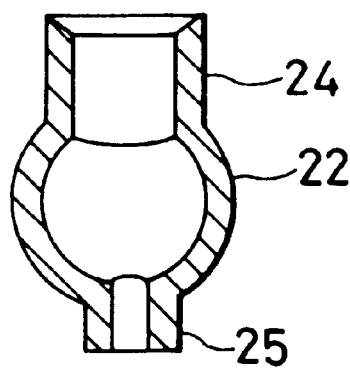
FIG. 5(a) is a longitudinal sectional view of still further another embodiment of the plasma flame furnace in which the barrier member is eliminated.
Figure 5B:
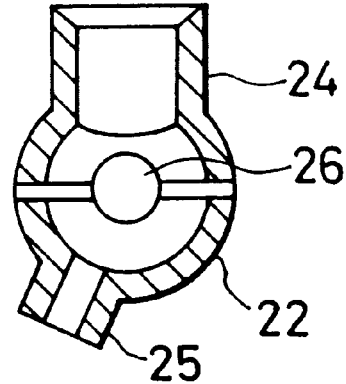
FIG. 5(b) is a longitudinal sectional view of another embodiment of the plasma flame furnace in which a longitudinal axis of the inlet tube and that of the outlet tube cross each other so that the plasma flame issued from the outlet tube is obliquely issued with respect to the inlet tube.
Figure 6:
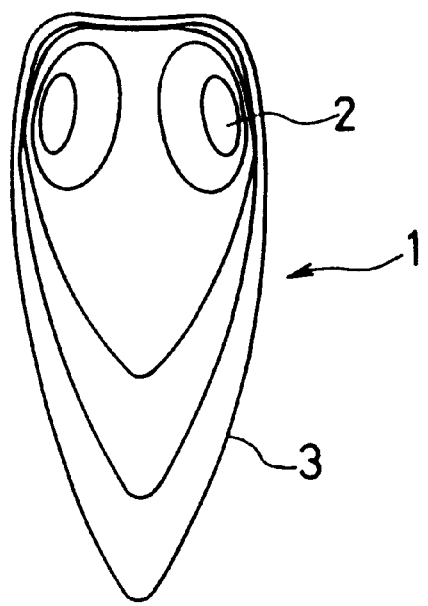
FIG. 6 is a schematic sectional view of the thermal plasma flame, illustrating its temperature distribution.
Figures 7A, 7B:
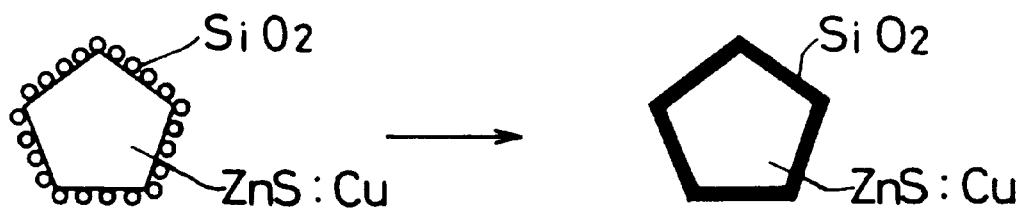
FIG. 7(a) is a schematic diagram of the phosphor particle ZnS:Cu, illustating the silica deposited on a surface of the phosphor.
FIG. 7(b) is a schematic diagram of the phosphor ZnS:Cu coated with the silica layer.

The trunk portion 22 forming the diffusion chamber of the plasma flame furnace 21 is formed into a cylindrical shape since the cylindrical shape is easily formed in manufacturing. However, it is possible for the trunk portion 22 to assume a spherical shape denoted by the reference numeral 22', as shown in FIG. 4(a). FIG. 4(b) is a partially broken side view of the spherical trunk portion 22', looking in the direction of the arrow Y of FIG. 4(a). As is clear from FIG. 4(b), each of the trunk portion 22' and the barrier member 26' assumes a spherical shape. Further, the spherical barrier member 26' is fixedly mounted in a central area of the hollow trunk portion 22' through a shaft 26a. Further, as shown in FIG. 5(a), the barrier member may be eliminated from the interior of the trunk portion 22. Further, as shown in FIG. 5(b), a longitudianl axis of the inlet tube 24 and that of the outlet tube 25 may cross each other so that the plasma flame issued from the outlet tube 25 is obliquely injected with respect to the longitudinal axis of the inlet tube. Further, although the barrier member 26 assumes a rod-like or a spherical shape, it may assume any shape capable of diffusing and stirring the plasma flame.

In the heat treatment apparatus of the present invention having the above construction, as shown in FIG. 1, the plasma flame produced in the quartz pipe 12 of the plasma torch 11 enters the plasma flame furnace 21 through the inlet tube 24 and passes through a space between an inner peripheral surface of the trunk portion 22 and an outer peripheral surface of the barrier member 26, and then enters the outlet tube 25 from which the plasma flame is injected into the reactor column 31. At this time, the entire plasma flame furnace 21 is heated by the plasma flame passing therethrough. Consequently, the plasma flame injected from the outlet tube 25 loses a part of its heat energy, and, therefore decreases in temperature, its vortex stream is diffused and stirred to broaden its flame area of a uniform and proper temperature.

On the other hand, as shown in FIG. 1, the reactor column 31 assumes a cylindrical shape one end of which is closed to form a bottom. A cylindrical portion 32 of the reactor column 31 is provided with an upper flange portion 33 on which an upper lid 34 is detachably mounted. And, the plasma torch 11 having its lower portion fixed to the plasma flame furnace 21 is fixedly mounted on the upper lid 34 of the reactor column 31.

The reactor column 31 is provided with a starting material supply tube 41 for supplying a starting material to the reactor column 31. Consequently, a front end of the supply tube 41 opens into the interior of the reactor column at a position under the outlet tube 25 of the plasma flame furnace 21.

In operation, when the starting material, i.e., workpiece such as particles and the like is injected into the reactor column 31 by means of a suitable gas, such workpiece is heated by the plasma flame injected from the outlet tube 25, and drops in the reactor column 31.

Incidentally, in the apparatus of the present invention, preferably the plasma torch 11 is of a radio-frequency induction thermal plasma type. However, the plasma torch 11 may be of an electrode-type.

EXAMPLES

The following tests were conducted using the heat treatment apparatus of the present invention having the above construction as shown in FIG. 1.

PARTICULARS OF THE APPARATUS:
  Re: The plasma torch 11:
    an inner diameter of the quartz pipe 12: 46 mm, and
    an inner diameter of the radio-frequency induction coil 17: 70 mm; and,
  Re: The plasma flame furnace 21:
    an inner diameter "A" of the inlet tube 24: 37 mm,
    an inner diameter C of the outlet tube 25: 20 mm, and
    an inner diameter B of the trunk portion 22: 50 mm;
    an outer diameter D of the barrier member 26: 30 mm.

EXAMPLE 1

A test was conducted as an example of the thermochemical synthesis treatment of a workpiece or substance under the following conditions.

CONDITIONS:

Workpiece or substance: high purity polycrystalline silicon;

Input power of the radio-frequency induction coil 17: 4 MHz, 15 kW;

Supplied gases (i.e., plasma gases):
  one supplied from the first gas supply tube 13:
    Ar gas, the flow rate thereof was 15 liter/min;
  one supplied from the second gas supply tube 14:
    Ar gas, the flow rate thereof was 20 liter/min; and
      one supplied from the third gas supply tube 15: Ar gas, the flow rate thereof was 30 liter/min;

Quenching gas: Ar—$H_2$ mixture gas supplied from the quencing gas supply tube 19, the flow rate of the Ar gas was 20 liter/min, and that of $H_2$ gas was 20 liter/min; and Bubbling gas: one supplied from the supply tube 41, the one was silicon tetrachloride ($SiCl_4$) having a temperature of 25 degrees centigrade and having been bubbled by means of hydrogen gas a flow rate of which was 21 liter/min.

As a result, through the following chemical reaction: $SiCl_4+2H_2=Si+4HCl$, a powder of ultra purity polycrystalline silicon was produced. At this time, the reaction temperature was steadily kept within a range of from 900 to 1300 degrees centigrade by the use of the heat treatment apparatus of the present invention. Consequently, it was found that the heat treatment apparatus of the present invention was capable of synthesizing the ultra purity polycrystalline silicon at low cost in a steady manner.

EXAMPLE 2

Another test was conducted as an example of the sphering treatment of a workpiece or substance by heating and melting the substance under the following conditions.

CONDITIONS:

Workpiece or substance: a powder of a phosphor made of BaFCl: Eu;

Input power of the radio-frequency induction coil 17: 3 MHz, 15 kW;

Supplied gases (i.e., plasma gases):
  one supplied from the first gas supply tube 13: Ar gas, the flow rate thereof was 30 liter/min; and
  one supplied from the second gas supply tube 14: Ar gas, the flow rate thereof was 40 liter/min;

Carrier gas: Ar gas, the flow rate thereof was 20 liter/min, by the use of which the powder of the phosphor, i.e., BaFCl: Eu was supplied through the supply tube 41, the flow rate of the powder being 5 gram/min, and the grain size of the powder was within a range of from 1 to 10 $\mu$m. As a result, the spherical particles of the phosphor, i.e., BaFCl: Eu having a grain size of from 1 to 10 $\mu$m was produced, the yield of which was 98 percent. In contrast with this, a corresponding yield in the prior art is only 60 percent due to occurrence of a large amount of very fine particles in the product. The above fact shows that the heat treatment apparatus of the present invention is excellent in heat control, which reduces an evaporation loss of the workpiece caused by overheating, and also reduces the amount of ultrafine powder in its product. As for the brightness of the product produced by the heat treatment apparatus of the present invention, there is substantially no difference between the starting material and the completed product. In the prior art, the starting material is partially decomposed, so that the completed product is poor in brightness. In contrast with this, in the heat treatment apparatus of the present invention using the radio-frequency induction plasma, since the workpiece or substance is free from any contamination in heating and also subjected to a uniform temperature in heating, there is no fear that the starting material is damaged in its quartz structure during the sphering treatment thereof.

EXAMPLE 3

Further another test was conducted as an example of the sphering treatment of a workpiece or substance by heating and melting the substance under the following conditions.

CONDITIONS:

Workpiece or substance: a powder of another phosphor, i.e., $Y_2SiO_5$:Tb;

Input power of the radio-frequency induction coil 17: 3 MHz, 20 kW;

Supplied gases (i.e., plasma gases):
  one supplied from the first gas supply tube 13: Ar gas, the flow rate thereof was 40 liter/min; and
  one supplied from the second gas supply tube 14: Ar gas, the flow rate thereof was 45 liter/min;

Carrier gas: Ar gas, the flow rate thereof was 15 liter/min.

By the use of this carrier gas, the powder of the phosphor, i.e., $Y_2SiO_5$:Tb was supplied through the supply tube 41, the flow rate of the powder being 5 gram/min, and the grain size of the powder was within a range of from 1 to 10 $\mu$m.

As a result, the spherical particles of the phosphor having a grain size of from 1 to 10 $\mu$m was produced, the yield of which was 98 percent. In contrast with this, a corresponding yield in the prior art is only 60 percent due to occurrence of a large amount of ultrafine powder in the product. The above fact shows that the heat treatment apparatus of the present invention is excellent in heat control, which reduces an evaporation loss of the workpiece caused by overheating, and also reduces the amount of ultrafine powder in its product, as is in the EXAMPLE 2. Further, as a result of X-ray analysis of the product, though a peak of a different substance (i.e., yttrium oxide: $Y_2O_3$) appears in a corresponding product of the prior art, such peak did not appear in the product produced by the heat treatment apparatus of the present invention. The product of the present invention has the substantially same pattern as that of the starting material in the X-ray diffraction thereof. The above fact shows that, though the product of the prior art contains a substance different from the starting material since the starting material is damaged in its quartz struction during heating, the product produced by the heat treatment apparatus of the present invention using the radio-frequency plasma is not damaged in its quartz struction since the starting material of the product is subjected to a uniform heating during its sphering treatment.

EXAMPLE 4

Still further another test was conducted as an example of the sphering treatment of a workpiece or substance by heating and melting the substance under the following conditions.

CONDITIONS:

Workpiece or substance: an intermetallic compound: $Nb_3Al$;

Input power of the radio-frequency induction coil 17: 3 MHz, 15 kW;

Supplied gases (i.e., plasma gases):
one supplied from the first gas supply tube 13: Ar gas, the flow rate thereof was 30 liter/min; and
one supplied from the second gas supply tube 14: Ar gas, the flow rate thereof was 45 liter/min;

Carrier gas: Ar gas, the flow rate thereof was 20 liter/min.

By the use of this carrier gas, the powder of the intermetallic compound: $Nb_3Al$ was supplied through the supply tube 41, the flow rate of the powder being 5 gram/min, and the grain size of the powder was within a range of from 1 to 10 μm.

The intermetallic compound: $Nb_3Al$ has a melting point of 1960 degrees centigrade. On the other hand, aluminum contained in the starting material has a boiling point of 2467 degrees centigrade, and, therefore evaporates during the conventional heat treatment to form ultrafine powder. Due to occurrence such ultrafine powder in the product, the product of the prior art are often different in composition from the starting material. In contrast with this, in the heat treatment apparatus of the present invention, since the starting material is heated up to a predetermined temperature slightly above the melting point of the starting material to sphere it, there is no fear that the material is decomposed during its sphering treatment. Conseqeutly, the product produced by the apparatus of the present invention was a powder of a so-called "bcc structure (i.e., A2 type)" intermetallic compound: $Nb_3Al$, the yield of which was 98 percent, and the grain size thereof was within a range of from 1 to 100 μm. The product powder thus produced was then sintered to produce a sintered product. The sintered product was then rolled at room temperature. The thus rolled sintered product was excellent in elongation properties. In the heat treatment apparatus of the present invention, since its quenching operation is facilitated, it is possible for the starting material to become the "bcc structure (i.e., A2 type)" product powder.

EXAMPLE 5

Another test was conducted as an example of the coating treatment of a workpiece or substance by heating and melting only a surface of the substance under the following conditions.

CONDITIONS:

Workpiece or substance: a phosphor of ZnS:Cu; and, silica (i.e., $SiO_2$) deposited on the surface of each of the phosphor particles;

Input power of the radio-frequency induction coil 17: 4 MHz, 15 kW;

Supplied gases (i.e., plasma gases):
one supplied from the first gas supply tube 13: Ar gas, the flow rate thereof was 20 liter/min; and
one supplied from the second gas supply tube 14: Ar gas, the flow rate thereof was 30 liter/min;

Carrier gas: Ar gas, the flow rate thereof was 20 liter/min.

By the use of this carrier gas, the powder of the phosphor (i.e., ZnS:Cu), on which colloidal silica (i.e., $SiO_2$) deposited, was supplied through the supply tube 41. The flow rate of the powder was 5 gram/min, and the grain size of the powder was 20 μm.

The results of the test is shown in the accompanying Table 1 in comparison with the corresponding test results of the conventional heat treatment using a direct radio-frequency induction plasma heating. As for water-resisting properties of the product, the product particle was first immersed in $AgNO_3$ aqueous solutions, and then determined in water-resisting properties on the basis of its color variation occurring after such immersion. As is clear from the Table 1, each of the particles of the starting material assumes brown color immediately after it is immersed in the $AgNO_3$ solutions, which shows that the starting material is poor in water-resisting properties. On the other hand, each of the particles coated with a silica layer does not change in color even after a lapse of 12 hours from the time each of the particles is immersed in the $AgNO_3$ solutions, irrespective of whether each of the particles coated with the silica layer is produced according to the present invention or according to the prior art. This shows that the silica layer formed by heating and melting thereof on the surface of each of the particles of the starting material imparts its water-resisting properties to each of the particles of the starting material. However, in a brightness examination of the product thus prepared, the product produced according to the prior art using a direct heating by means of the radio-frequency induction plasma fails to light even when conditions of the brightness examination are changed. This shows that the starting material (i.e., ZnS:Cu) is damaged when heated to a high temperature according to the prior art. In contrast with this, in the heat treatment apparatus of the present invention, the product produced thereby shows a brightness of 77 percent when subjected to an 100-voltage application examination, and a brightness of 98 percent in a 200-voltage application examination both in a condition in which the starting material shows a brightness of 100 percent in these examination. This shows that the heat treatment apparatus of the present invention may melt only the silica deposited on the surface of each of the particles of the starting material of ZnS:Cu to permit the thus melted silica to coat the surface of each of the particles, without increasing the temperature of the particles.

Now, a second embodiment of the heat treatment apparatus of the present invention will be described, in which embodiment a reaction chamber is provided in the side of the outlet tube of the plasma flame furnace.

Figure 8:
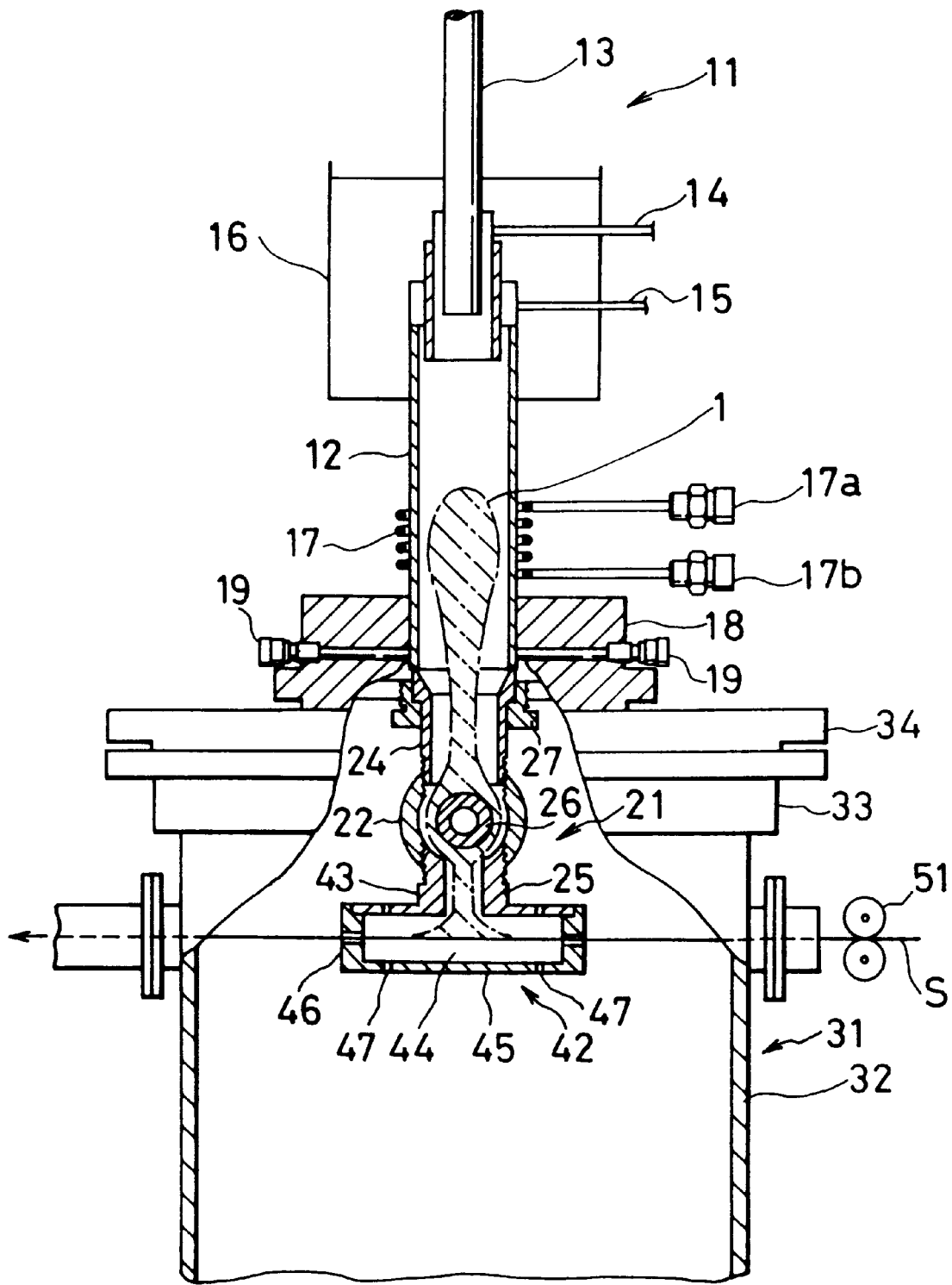
FIG. 8 is a longitudinal sectional view of a second embodiment of the heat treatment apparatus according to the present invention using the thermal plasma.
Figure 9:
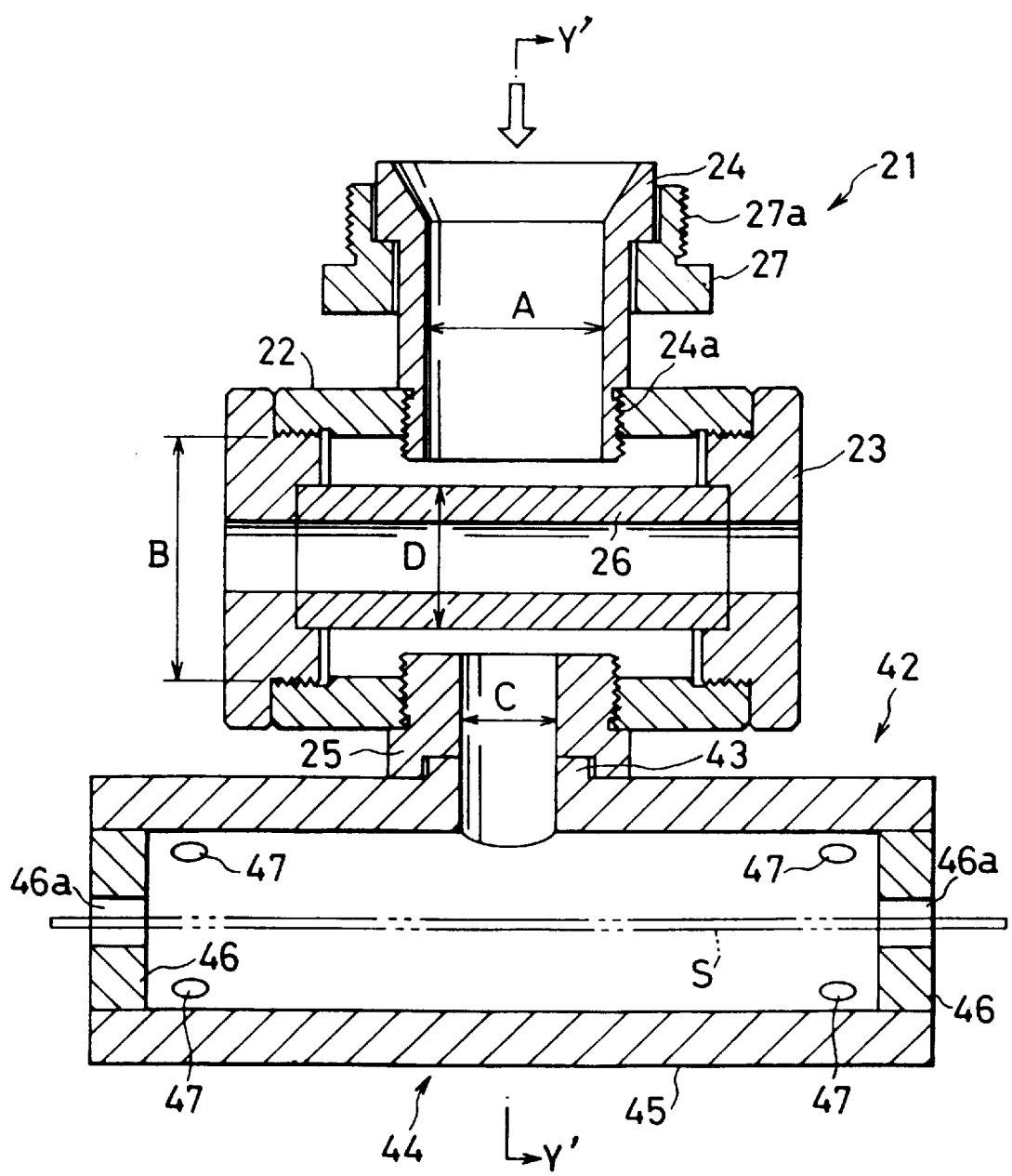
FIG. 9 is an enlarged longitudinal sectional view of the second embodiment of the plasma flame furnace in the heat treatment apparatus shown in FIG. 8; amd
Figure 10:
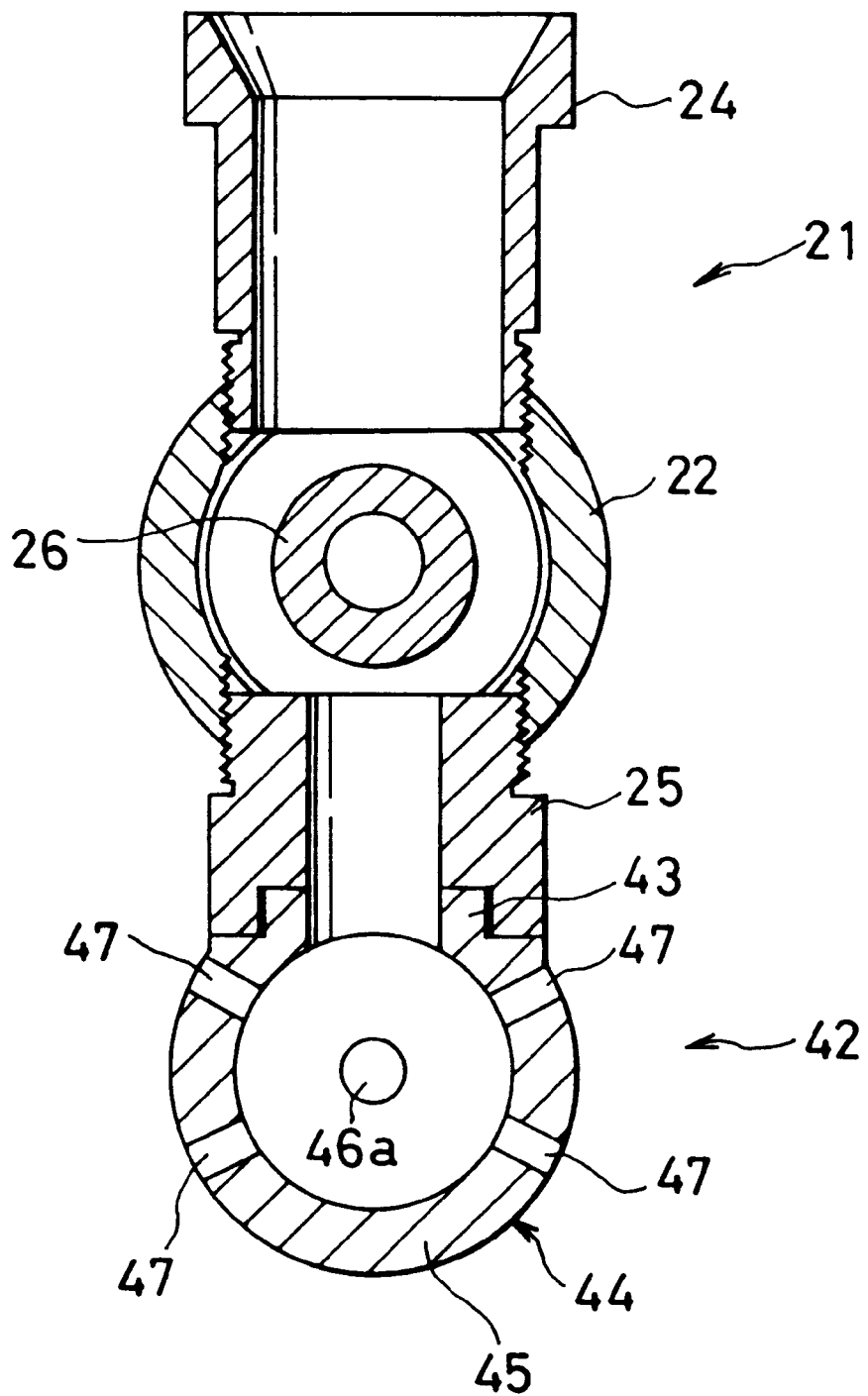
FIG. 10 is an enlarged longitudinal sectional view of the plasma flame furnace and the reactor column in the heat treatment apparatus of the present invention, taken along the line Y'—Y' of FIG. 9.

This second embodiment of the apparatus of the present invention is suitable for the heat treatment of carbon fibers. FIG. 8 shows a longitudinal sectional view of the second embodiment of the heat treatment apparatus of the present invention using the thermal plasma as a heating means. FIG. 9 shows an enlarged longitudinal sectional view of the plasma flame furnace and the reaction chamber. FIG. 10 shows a longitudinal sectional view of the the plasma flame furnace and the reaction chamber, taken along the line Y'—Y' of FIG. 9. The sectional view shown in FIG. 10 is taken along a plane perpendicular to the plane of the paper of FIG. 8.

Now, the second embodiment of the heat treatment apparatus of the present invention will be described with reference to the accompanying drawings. In this second embodiment, a reaction chamber 42 and a supply means 51 is newly provided, while the remaining construction of the second embodiemnt is substantially the same as that of the first embodiment of the heat treatment apparatus of the present invention.

As shown in FIG. 8, the reaction chamber 42 is provided with an inlet conduit 43 which is fixedly mounted on the outlet tube 25 of the plasma flame furnace 21. Further, the reaction chamber 42 is provided with a heating portion 44 which forms a hollow cylindrical casing 45. The casing 45 has its opposite ends closed with a pair of end plates 46 and has a part of its peripheral surface fixed to the inlet conduit 43. This conduit 43 is provided with an inlet opening through which the plasma flame is introduced into the conduit 43. The cylindrical casing 45 is provided with a plurality of exhaust ports 47 in the vicinity of each of its opposite peripheral end potions. Through these exhaust ports 47, the plasma gases are discharged from the reaction chamber 42. The number and the positions of these exhaust ports 47 may be experimentally determined so that a carbon fiber S as the workpiece is uniformly heated. In a central area of each of the end plates 46, there is provided a through-hole 46a through which the carbon fiber S passes. On the other hand, the reaction chamber 42 is fixedly mounted on a lower portion of the outlet tube 25 of the plasma flame furnace 21 through a threaded portion 43a of a front end of the inlet coduit 43. Both the plasma flame furnace 21 and the reaction chamber 40 are made of carbon materials, and, therefore prevented from chemically reacting with the carbon fiber S.

Casting minor details aside, as shown in FIG. 8, the supply means 51 is provided in the vicinity of the reactor column 31, and continuously supplies the carbon fiber S as a starting material into the reactor column 31 in a hermetical manner. More particularly, the carbon fiber S is continuously supplied to a heating portion 44 of the reaction chamber 42 by means of the supply means 51.

In the second embodiment of the heat treatment apparatus of the present invention having the above construction, in operation, the plasma flame 1 passes through the plasma flame furnace 21 to enter the outlet tube 25 and then the inlet conduit 43, from which the plasma flame 1 is introduced into the heating portion 44 of the reaction chamber 42 to heat the carbon fiber S. After completion of heating of the carbon fiber S, the plasma flame 1 is discharged from the exhaust ports 47 into the reactor column 31. At this time, the vortex stream of the plasma flame 1 is diffused and stirred, so that the plasma flame 1 may broaden its flame area of a uniform temperature and may heat a wall of the heating portion 44 of the reaction chamber 42.

EXAMPLE 6

A test was conducted as an example of the physical property improving treatment of a workpiece or substance under the following conditions, by using the heat treatment apparatus of the present invention having the above construction shown in FIG. 8.

PARTICULARS OF THE APPARATUS AND THE WORKPIECE:
  Re: Dimensions of the reaction chamber 42:
    an inner diameter of the hollow cylindrical casing 45: 25 mm;
    a longitudinal length of the casing 45: 85 mm;
  Re: The carbon fiber S:
    substance: a pitch-based carbon fiber; diameter of filament: 10 $\mu$m; feed speed: 10 m/min; and
CONDITIONS:
  Input power of the radio-frequency induction coil 17: 4 MHz, 15 kW;

Supplied gases (i.e., plasma gases):
  one supplied from the first gas supply tube 13:
    Ar gas, the flow rate thereof was 30 liter/min; one supplied from the second gas supply tube 14:
    Ar gas, the flow rate thereof was 45 liter/min; and
  Quenching gas: Ar gas supplied from the quenching gas tube 19, the flow rate of the Ar gas was 20 liter/min.

As the results of the above test, the carbon fiber as a completed product according to the prior art subjected to a heat treatment conducted at a temperature of 3000 degrees centigrade in a conventional electric furnace has a tensile strength of 400 kgf/mm and an elastic modulus of 80.0 tonf/mm, whereas the carbon fiber as a completed product produced by the apparatus of the present invention using a heat treatment conducted at a temperature of 3300 degrees centigrade has a tensile strength of 440 fkg/mm and an elastic modulus of 90.0 tonf/mm. This shows that the product of the present invetion is improved by 10 percent in both the tensile strength and the elastic modulus in comparison with the corresponding product produced according to the prior art. Namely, it is hard for the conventional electric furnace to obtain such a high temperature of 3300 degrees centigrade. Even if it is obtaind, the cost is not realistic. On the other hand, it is very easy for the heat treatment using the radio-frequency indution thermal plasma to obtain such a high temperature of 3300 degrees centigrade as is in the apparatus of the present invention. Further, in the apparatus of the present invention having the above constrution, the plasma flame used therein is sufficiently stirred in comparison with that used in the conventional direct plasma heating, which makes it possible to uniformly heat the workpiece (i.e., the starting material or carbon fiber).

As described above, in the heat treatment apparatus of the present invention using the thermal plasma, since the plasma flame furnace 21 is provided in a downstream side of the plasma torch 11 so that the plasma flame issued from the torch 11 is passed through the furnace 21 and thereafter injected outward, it is possible to decrease the temperature of the plasma flame without any fear of the plasma flame's ceasing to exist, which makes it possible to broaden a flame area of a uniform temperature in the plasma flame. Namely, since the workpiece supplied from the supply means 51 into the reactor column 31 is heated by the plasma flame issued from the plasma furnace 21 during the heat treatment thereof, it is possible to prevent the workpiece from being overheated or partially heated, which may stabilize the heat treatment using the thermal plasma of the present invention in comparison with the heat treatment using the conventional electric furnace.

Further, In the plasma flame furnace of the apparatus of the present invention, its plasma passage is constructed of the inlet and the outlet tube through which the plasma flame flows in and out of the plasma flame furnace. Further, the diffusion chamber is disposed in between the inlet and the outlet tube, and the barrier member is provided inside the diffusion chamber. Due to the above construction, the plasma flame produced by the plasma torch passes through both the plasma passage and the diffusion chamber and diffused and stirred by means of the barrier member, so that the temperature of the plasma flame is decreased and a flame area of a uniform temperature is broadened in the plasma flame. In addition, in the heat treatment apparatus of the present invention, since the plasma torch is provided with the quenching gas supply means, which makes it easier the control of the plasma flame in temperature and in flame area of the uniform temperature.

Further, as described with reference to the second embodiment of the heat treatment apparatus of the present invention in the above, the reaction chamber provided in the downstream side of the plasma flame furnace facilitates the heat treatment of an elongated workpiece such as fibers.

The plasma flame furnace may be made of heat-resisting materials such as carbon-based materials and ceramics, or made of metals when a suitable cooling means is provided in the plasma flame furnace, which enables the plasma furnace to be used in a lower temperature range according to its applications and purposes. Although the plasma torch used in the heat treatment apparatus of the present invention is of a type of the radio-frequency induction plasma, it is also possible for the plasma torch of the present invention to be of an electrode type.

Further, according to the heat treatment method of the present invention for heat treating the workpiece such as particles, the plasma flame having been lowered in temperature and broadened in flame area of the uniform temperature due to its passage through the plasma flame furnace disposed in the downstream of the plasma torch is used to heat treat the particles. Consequently, in comparison with the conventional heat treatment method in which the particles are directly heated by an ultrahigh temperature thermal plasma, the method of the present invention may prevent the particles from being overheated and stabilize the heat treatment of the particles, which enables the particles to become a high quality product after completion of their heat treatment according to the present invention.

Further, in the sphering treatment method of the present invention for heating and melting the particles so that each of the particles assumes a spherical shape after solidification thereof, and also in the coating treatment method of the present invention for heating and melting only a surface portion of each of the particles so that each of the particles is coated with the thus melted and then solidified surface portion thereof after solidification of the particles, since the particles are heated by the plasma flame having been lowered in temperature and broadened in flame area of the uniform temperature due to its passage through the plasma flame furnace, it is possible to prevent the particles from being overheated, and, therefore from losing its ingredients by evaporation, which enables theses methods of the present invention to produce the product uniform in quality. Consequently, in the spheroidizing treatment method of the present invention, there is no fear that the percentage of the ultrafine powder increases in the product, i.e., no fear that the yield of the usable product, i.e., spherical particles decreases to make it difficult to classify the spheroidized particles or product in grain size. On the other hand, in the coating treatment method of the present invention, there is substantially no fear that the product is damaged in physical properties, which enables the coating treatment method of the present invention to produce the coated particles or product in an easy manner.

Further, in the coating treatment method of the present invention, the phosphor of ZnS:Cu may be coated with silica after completion of heating, melting and solidification of silica having been deposited on the phosphor, and becomes a completed product. A powder of the thus obtained phosphor product is improved in water-resisting properties without being damaged in other physical properties, particularly in brightness. Consequently, it is possible to eliminate the use of conventional protective films hitherto used to sandwich the phosphor therebetween in order to prevent the phosphor from absorbing moisture in the air. Such absorption of moisture damages the phosphor in physical properties.

As described in the above, the heat treatment apparatus of the present invention uses a clean heat source such as a thermal plasma which is lowered in temperature to broaden its flame area of a uniform temperature in use. Consequently, any of the thermochemical synthesis treatment of the substance, the spheroidizing treatment of the particles and the coating treatment of the substance may be performed using the above-mentioned low temperature thermal plasma without deteriorating the thus produced product in physical properties, while keeping the product clean.

Further, in production of the product particles produced by the heat treatment method of the present invention using the thermal plasma, and, also in such heat treatment method of the present invention, the above-mentioned low temperature thermal plasma is used as a clean heat source, which plasma is lower in temperature and larger in flame area of uniform temperature than the conventional thermal plasma. Consequently, for example, in the sphering treatment of the present invention, it is possible to obtain the product particles which are clean and uniform in grain size, and also possible to increase the yield of the usable product particles without damaging the physical properties thereof. Further, in the coating treatment of the present invention, it is possible to protect the surface of each of the particles by a surface substance which is deposited on the surface of each of the particles and heated, melted thereon to entirely cover the surface of each of the particles, and then solidified to form a surface layer of each of the particles. In these heating, melting and solidifying processes of the surface substance, each of the particles to be coated with the surface substance is not damaged in physical properties. The thus produced particle coated with the surface substance may be a phosphor particle improved in water-resisting properties. The manufacturing cost of this coated particle is low.

What is claimed is:

1. A heat treated substance, wherein said substance is subjected to a thermal plasma heat treatment conducted by means of a plasma flame being produced by a thermal plasma heat treatment apparatus comprising:

a thermal plasma torch for producing a thermal plasma at the downstream side of said thermal plasma torch;

a plasma flame furnace for controlling the heat of said thermal plasma thus produced by said plasma torch, said plasma flame furnace being disposed downstream from said thermal plasma torch;

a reactor column in which said workpiece is subjected to a thermochemical reaction, said reactor column being disposed downstream from said plasma flame furnace; and a supply means for supplying said workpiece into said reactor column, said supply means being disposed downstream from said plasma flame furnace, wherein said plasma flame furnace comprises:

a portion through which a plasma flame produced by said plasma torch passes, defined as a plasma passage; and a diffuser means for diffusing a stream of said plasma flame, wherein said plasma passage and said diffuser means comprise:

an inlet tube into which said plasma flame flows;

an outlet tube from which said plasma flame flows; and a diffusion chamber disposed between said inlet tube and said outlet tube, said diffusion chamber being enlarged in diameter with respect to said outlet tube, said diffusion chamber further comprising a barrier member, which changes the flow direction of said plasma flame, wherein said barrier member is disposed in said diffusion chamber of said plasma passage.

2. The heat treated substance as set forth in claim 1, wherein:

said thermal plasma heat treatment is conducted with respect to a carbon fiber to improve its physical properties by heating.

3. The heat treated substance as set forth in claim 1, wherein:

said thermal plasma heat treatment is a thermochemical synthetic treatment of a substance.

4. The heat treated substance as set forth in claim 3, wherein:

said substance having been subjected to said thermochemical synthetic treatment is polycrystalline silicon.

5. The heat treated substance as set forth in claim 1, wherein:

said substance is a particle; and said thermal plasma heat treatment is a sphering treatment of said particle, wherein said particle is heated and melted to assume a spherical shape.

6. The heat treated substance as set forth in claim 5, wherein:

said particle having been subjected to said sphering treatment is of a phosphor.

7. The heat treated substance as set forth in claim 5, wherein:

said particle having been subjected to said sphering treatment is of an intermetallic compound.

8. The heat treated substance as set forth in claim 1, wherein:

said substance is a particle; and said thermal plasma heat treatment is conducted with respect to said particle in a manner such that said particle is heated to have only its surface portion melted, said surface portion thus melted being then cooled to form a solidified layer completely covering an inner portion of said particle.

9. The heat treated substance as set forth in claim 1, wherein:

said substance is a particle; and said thermal plasma heat treatment is a coating treatment conducted with respect to said particle in a manner such that said particle is coated with the same substance as that of said particle or another substance different from that of said particle, and heated by means of said plasma flame injected into said reactor column to have only its surface portion melted, said surface portion thus melted being then cooled to form a solidified layer completely covering an inner portion of said particle.

10. The heat treated substance as set forth in claim 8, wherein:

said particle having been subjected to said coating treatment is of a phosphor.

11. The heat treated substance as set forth in claim 9, wherein:

said inner portion of said particle is of ZnS:Cu phosphor; and said surface portion of said particle forming said solidified layer completely covering said inner portion of said particle is of silica.

12. The heat treated substance as set forth in claim 9, wherein said particle having been subjected to said coating treatment is a phosphor.

13. A thermal plasma heat treatment method for subjecting a particle to a heat treatment conducted by means of a thermal plasma, wherein said thermal plasma is produced by a thermal plasma heat treatment apparatus comprising:

a thermal plasma torch for producing a thermal plasma at the downstream side of said thermal plasma torch;

a plasma flame furnace for controlling the heat of said thermal plasma thus produced by said plasma torch, said plasma flame furnace being disposed downstream from said thermal plasma torch;

a reactor column in which said workpiece is subjected to a thermochemical reaction, said reactor column being disposed downstream from said plasma flame furnace; and a supply means for supplying said workpiece into said reactor column, said supply means being disposed downstream from said plasma flame furnace;

wherein said plasma flame furnace comprises:

a portion through which a plasma flame produced by said plasma torch passes, defined as a plasma passage; and a diffuser means for diffusing a stream of said plasma flame, wherein said plasma passage and said diffuser means comprise:

an inlet tube into which said plasma flame flows;

an outlet tube from which said plasma flame flows; and a diffusion chamber disposed between said inlet tube and said outlet tube, said diffusion chamber being enlarged in diameter with respect to said outlet tube, said diffusion chamber further comprising a barrier member, which changes the flow direction of said plasma flame, wherein said barrier member is disposed in said diffusion chamber of said plasma passage.

14. The thermal plasma heat treatment method for heat treating the particles, as set forth in claim 13, wherein:

a sphering treatment of said particle is conducted in a manner such that said particle is heated and melted to assume a spherical shape.

15. The thermal plasma heat treatment method for heat treating the particles, as set forth in claim 13, wherein:

said heat treatment of said particle conducted by means of said thermal plasma is a coating treatment in which said particle is heated to have only its surface portion melted, said surface portion thus melted being then cooled to form a solidified layer completely covering an inner portion of said particle.

16. The thermal plasma heat treatment method for heat treating the particles, as set forth in claim 13, wherein:

said heat treatment of said particle conducted by means of said thermal plasma is a coating treatment conducted with respect to said particle in a manner such that said particle is coated with the same substance as that of said particle or another substance different from that of said particle, and heated to have only its surface portion melted, said surface portion thus melted being then cooled to form a solidified layer completely covering an inner portion of said particle.

17. The thermal plasma heat treatment method for heat treating the particles, as set forth in claim 16, wherein:

said inner portion of said partiucle is of ZnS:Cu phosphor; and said surface portion of said particle forming said solidified layer completely covering said inner portion of said particle is of silica.

* * * * *

UNITED STATES PATENT AND TRADEMARK OFFICE
CERTIFICATE OF CORRECTION

PATENT NO. : 6,156,993
DATED : December 5, 2000
INVENTOR(S) : Yoshiaki Inoue; Seiji Yokota; Akira Terajima; Kazuhiro Kawasaki; Masaaki Tamatani; Keiko Albessard; Naotoshi Matsuda; Miwa Okumura; Hirofumi Takemura It is certified that error appears in the above-identified patent and that said Letters Patent is hereby corrected as shown below:

Title page,
Item [30], in the Foreign Application Priority Data,
Line 2, "8-635652" should read -- 8-356652 --.

Signed and Sealed this

Twenty fifth Day of September, 2001

Attest:

*Attesting Officer*

NICHOLAS P. GODICI
*Acting Director of the United States Patent and Trademark Office*